United States Patent
Seaquist et al.

[11] Patent Number: 6,126,110
[45] Date of Patent: Oct. 3, 2000

[54] HORIZONTALLY OPPOSED TRUNNION FORWARD ENGINE MOUNT SYSTEM SUPPORTED BENEATH A WING PYLON

[75] Inventors: John D. Seaquist, Long Beach; Chris Culbertson, Irvine, both of Calif.

[73] Assignee: McDonnell Douglas Corporation, St. Louis, Mo.

[21] Appl. No.: 08/995,853

[22] Filed: Dec. 22, 1997

[51] Int. Cl.⁷ .................................................. B64D 27/00
[52] U.S. Cl. ........................................... 244/54; 248/554
[58] Field of Search .................................. 244/54, 53 R, 244/55; 248/554, 555; 60/39.31

[56] References Cited

U.S. PATENT DOCUMENTS

| | | | |
|---|---|---|---|
| 2,234,394 | 3/1941 | Amiot | 244/54 |
| 2,398,704 | 4/1946 | Gassner | 244/54 |
| 2,958,480 | 11/1960 | Saulnier | 244/54 |
| 3,310,262 | 3/1967 | Robins et al. | 244/55 |
| 3,948,469 | 4/1976 | Brown | 244/55 |
| 4,079,981 | 3/1978 | Mahler et al. | 294/81 |
| 4,506,850 | 3/1985 | McConnell | 244/54 |
| 4,603,822 | 8/1986 | Chee | 244/54 |
| 4,725,019 | 2/1988 | White | 244/54 |
| 4,742,975 | 5/1988 | Pachomoff et al. | 244/54 |
| 5,238,206 | 8/1993 | Pachomoff | 244/54 |
| 5,474,258 | 12/1995 | Taylor et al. | 244/54 |

*Primary Examiner*—Galen L. Barefoot
*Attorney, Agent, or Firm*—Westerlund & Powell, P.C.; Robert A. Westerlund; Ramon R. Hoch

[57] ABSTRACT

The present invention relates to an engine mount assembly for supporting an aircraft engine in aft-cantilevered position beneath the aircraft wing. The assembly includes a pair forward engine mounts positioned on opposite sides of an integrally formed yoke member wrapped about the upper half of the engine casing. Each side of the yoke is preferably configured as an A-shaped frame member with the bottom portions joining each other and the pylon. To prevent "backbone bending" of the engine trunnion assembly, the forward engine mounts supported at opposite ends of the yoke engage the casing along its centerline. The trunnion assembly is preferably constructed of high strength titanium machined and/or forged.

15 Claims, 6 Drawing Sheets

HORIZONTALLY OPPOSED TRUNNION FORWARD ENGINE MOUNT SYSTEM SUPPORTED BENEATH A WING PYLON

This invention was made under contract no. NAS3-27239 awarded by NASA. The Government has certain rights to this invention.

BACKGROUND OF THE INVENTION

The present invention is directed to a mount for constraining an aircraft engine casing against vertical and axial displacements. In particular, the present invention is directed to a single, integrated aircraft engine mount assembly designed to constrain an engine casing supported beneath a wing-pylon by utilizing two forward horizontally opposed trunnions mounted on the centerline of the engine casing along with a pair of aft positioned engine mounts.

Typically, a separate thrust link system is employed to restrain an aircraft engine from movement due to axial thrust forces. Such a constraint system is employed on the Concorde, see FIG. 1, which shows an aft thrust link assembly with a common link between the two aft mounts. Details of the hardware employed on the Concorde mount are shown in FIG. 2. While many engine mount systems are statically determinate, the Concorde system is not. Rather than employing connecting linkages to accommodate various movements as required by the Concorde, the present invention employs a simplified design for maintaining contact between the engine casing and the pair of oppositely disposed mounts without the need for any connecting links.

Many known engine mount systems tend to create a "backbone bending" moment that is eliminated by the present invention. Typical is the type of structure taught in U.S. Pat. Nos. 4,079,981; 5,474,258 and 4,725,019. In each of these assemblies the forward engine mounts are located above the engine centerline. This arrangement can introduce a "backbone bending" moment which would damage the engine and its support equipment unless the stiffness of the assembly is increased by employing additional support structure as typically occurs.

A further approach is shown in U.S. Pat. Nos. 5,238,206 and 4,603,822. In each of these assemblies the aft engine mounts do not take engine thrust loads. In comparison, the present invention functions as a forward engine mount capable of taking engine thrust loads without additional support structure.

While the ability to take engine thrust loads is present in U.S. Pat. No. 4,742,975, this conventional assembly requires the use of two additional mount struts. The present invention eliminates the need for such struts through the unique structure to be explained.

As can be readily seen, existing assemblies usually employ some type of thrust link to prevent axial movement of the engine casing or require additional strut mounts that can be costly and, more importantly, add weight to the aircraft. When the engine mounts are located above the engine centerline, the backbone bending which inherently occurs can significantly reduce the life cycle of the engine and even result in structural failure with catastrophic results. As will become clear, the present invention provides a unique mount assembly which eliminates the problems associated with conventional structures by providing an integrated assembly that can be constructed at a reduced cost as compared to conventional engine mount assemblies.

SUMMARY OF THE INVENTION

The present invention comprises an engine mount assembly for supporting and, at the same time, constraining an engine casing against vertical and axial movements relative to the support pylon assembly. The engine casing may or may not be cantilevered in an aft position beneath the pylon. The mount assembly includes a pylon box attached to the aircraft wing. Attached to a suspended beneath the pylon box is a uniquely constructed yoke assembly having an A-Frame configuration which wraps around the engine and provides mounting pads for the lower fittings. Forward engine mounts are positioned on each side of the engine and include cylindrical end portions mounted in the lower fittings. Aft engine mounts are positioned to engage opposite sides of the casing. The forward engine mounts are positioned such that the line of action of each forward mount is substantially coincident with the center line of the engine casing. This simplifies the thrust link system and provides for a much more integrated mount than is currently employed.

The pylon box, forward engine mounts and lower fittings are preferably formed of highly machined titanium. The yoke is preferably formed from a machined titanium forging. The yoke is a center cut, high speed machined, thrust and vertical restraint structure. "Backbone bending" is eliminated by the thrust mounts being coincident with the centerline of the engine. While the trunnions are mounted horizontally to constrain the engine against both vertical and axial displacements, they do not introduce lateral constraints to the engine.

The trunnions are sufficient to restrain the engine casing from axial thrust movement as well as vertical movement without the need for a separate thrust link system as employed on the Concorde. The yoke is a single piece of titanium machined into an A-Frame configuration to transmit both vertical and axial loads to the pylon box.

BRIEF DESCRIPTION OF THE DRAWINGS

The above and other objects, features, and advantages of the present invention will become apparent from the following detailed description taken in conjunction with the accompanying drawings, in which.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize modifications, applications, and embodiments within the scope thereof and additional fields in which the present invention would be of significant utility.

Figure 1:
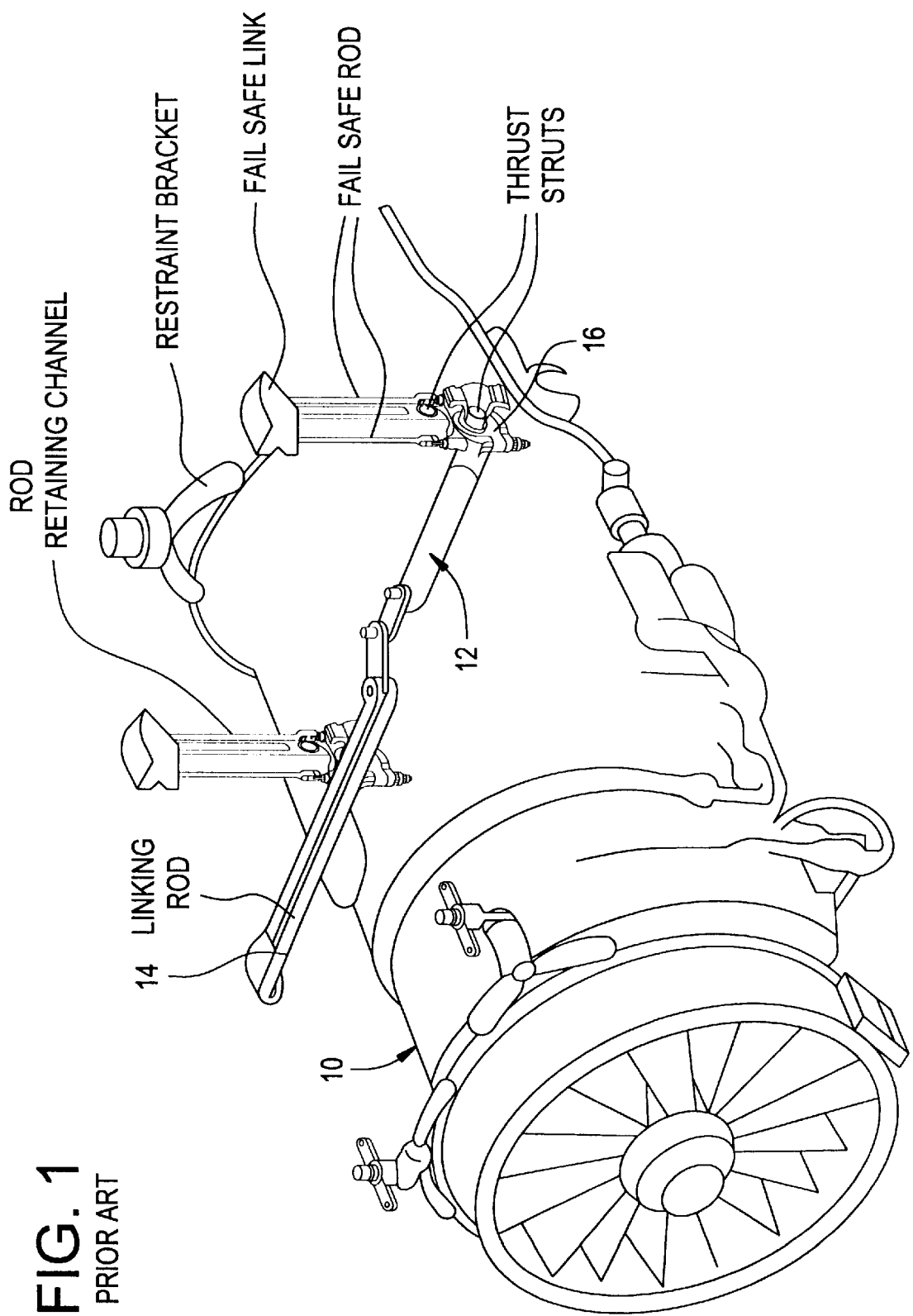
FIG. 1 is a schematic view of a prior art engine constraint system employed on the Concorde aircraft.
Figure 2:
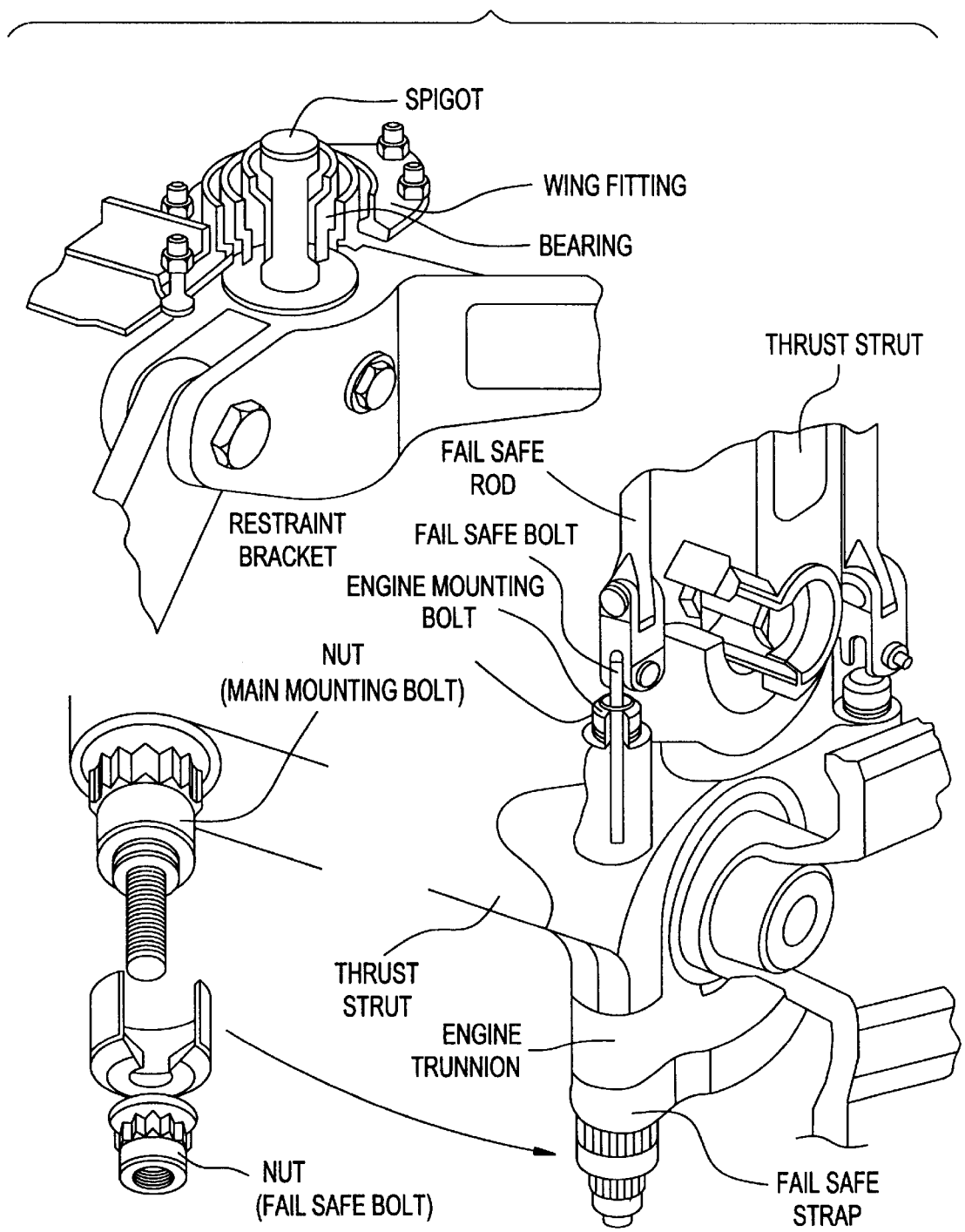
FIG. 2 is a schematic view of the prior art system of FIG. 1 showing details of the engine mount system.

With reference now to FIG. 1, there can be seen a schematic view of a prior art engine mount employed on the Concorde. The engine casing 10 is constrained against axial motion by the common link 12 extending between the aft mounts 14 and 16. The present invention eliminates the need for such a common link by the unique shape of the support members as well as their point of engagement with the engine casing as will be explained.

Figure 3:
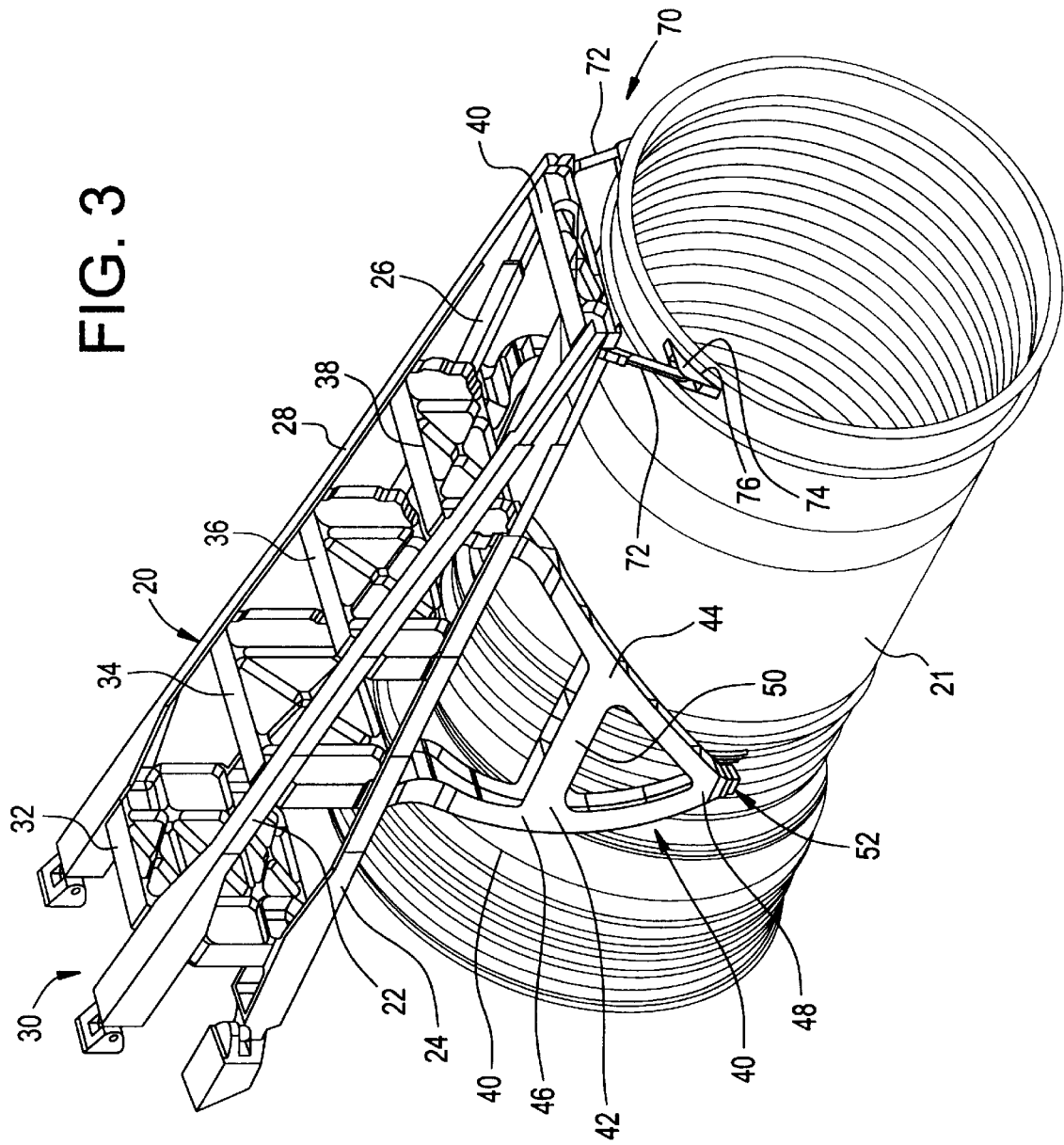
FIG. 3 is a schematic view of an engine mount system constructed in accordance with the present invention with the engine show.

As shown in FIG. 3, a pylon box formed in accordance with the present invention is shown at 20. Pylon box 20 extends in a substantially horizontal direction and is positioned above a conventional engine casing 21 Pylon box 20 is comprised of four tubular struts 22, 24, 26 and 28 forming a rectangular shape of diminishing size as the distance increases from the bottom end 30. In effect, each pair of parallel struts extending in the same vertical plane, 22, 24 and 26, 28 approach one another as the distance increases from connection members 30. Cross bracing 32, 34, 36, 38 and 40 extends between the pairs of parallel struts to form an integrated, substantially box-shaped pylon structure 20.

Figure 4:
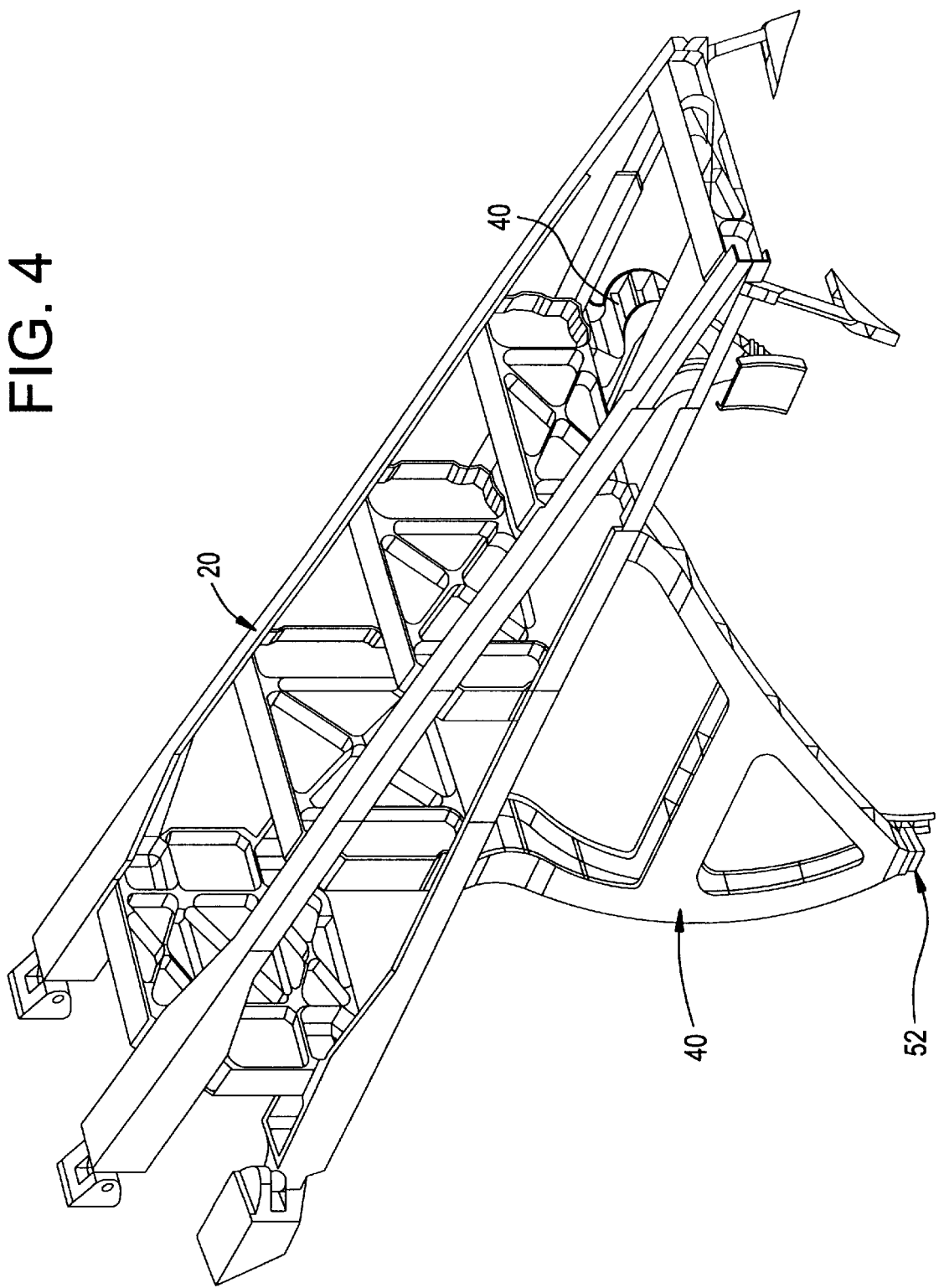
FIG. 4 is a schematic view of the engine mount system of FIG. 3 with the engine removed.

Extending downwardly from pylon box 20 is a yoke of semicircular configuration 40. Yoke 40 wraps around engine casing 21 and provides a mounting pad for supporting casing 21 as will become clear. Yoke 40 has a separate A-Frame portion 42 formed on each side consisting of a pair of support members 44 and 46 which extend into engagement with one another at a location 48 remote from pylon box 20. A cross arm 50 extends between and engages each of the connecting arms to form the A-shaped frame. While only a single A-frame yoke 40 can be seen in FIG. 3, a portion of the second, identically shaped A-frame yoke 40 can be seen in FIG. 4.

Attached to the remote or outboard end of each yoke 40 is a forward engine mount assembly 52. Each engine mount is constructed to engage the engine casing along its centerline to avoid creating "backbone bending" moments as would otherwise be the case if the engagement point is above the centerline as suggested in the prior art previously discussed.

Figure 5:
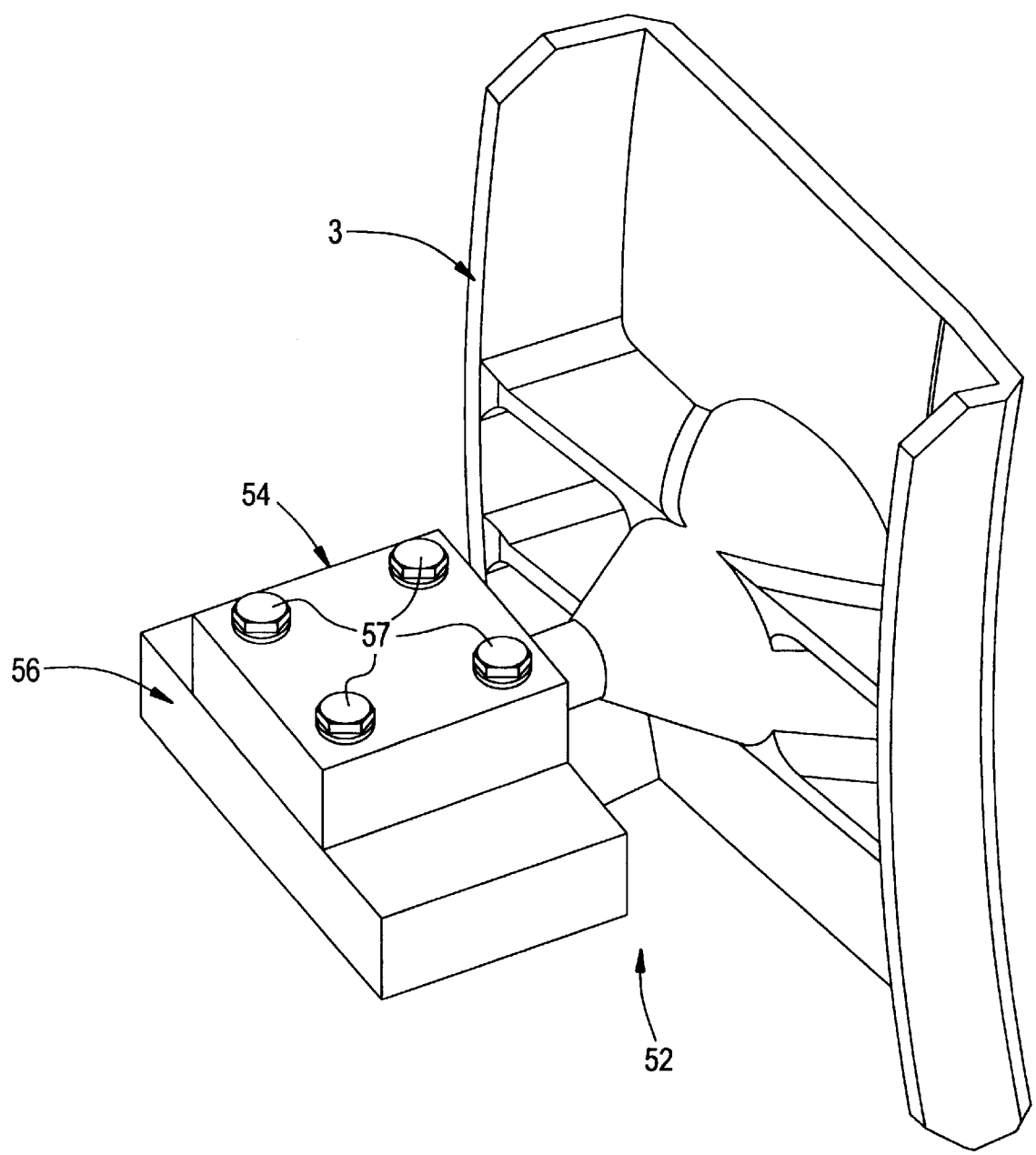
FIG. 5 is a schematic upwardly looking view of the forward engine mount employed in the system of FIG. 3.
Figure 6:
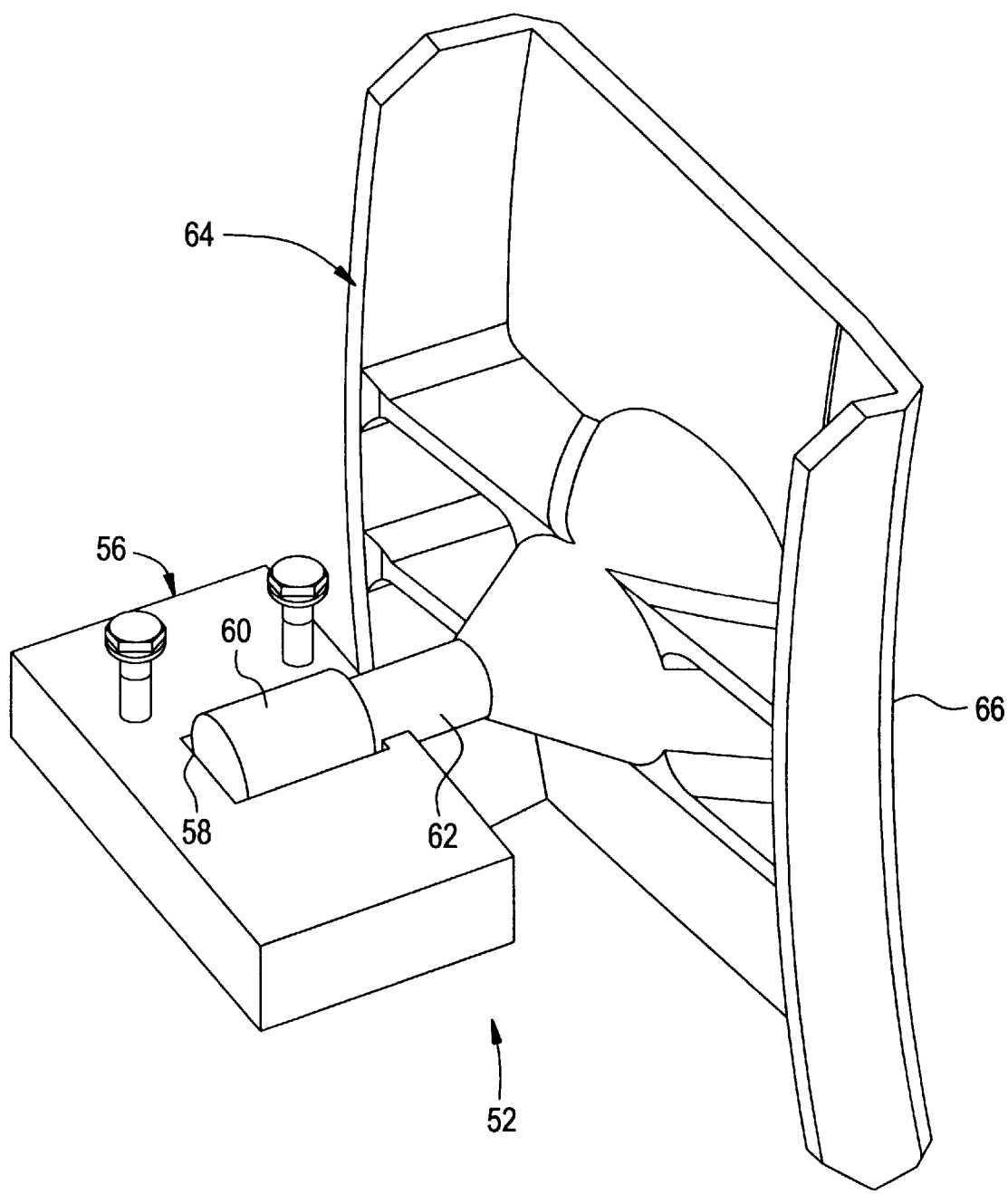
FIG. 6 is a view similar to FIG. 5 with the lower fitting removed.

As best shown in FIGS. 5 and 6, each forward engine mount assembly 52 includes a lower fitting 54 attached to an end plate 56 of the yoke 40 by means of a plurality of fasteners 57. Lower fitting 54 is preferably formed with a cylindrical recess, not shown, which is similar to a cylindrical recess 58 formed in end plate 56. When assembled, the two recesses form a cylindrical opening adaptable for receiving a cylindrical end portion 60 of the forward engine mount. As best seen in FIG. 6, cylindrical end portion 60 is attached to one end of a sleeve 62 which has an opposite end integrally attached to engine mount 64. As shown in FIGS. 3 and 6, engine mount 64 includes an end surface 66 curved to engage the curved outer surface of engine casing 21. The pair of oppositely disposed engine mounts 64 serve to constrain engine casing 21, and an engine positioned therein (not shown), from moving in both vertical and axial thrust directions. At the same time, vertical and axial loads created by the engine are passed through engine mounts 64, yokes 40 and to pylon box 20. The rigid structure of each yoke 40 along with the rectangular braced structure of pylon box 20 insures that such loads are more than adequately supported.

Each of the yokes 40 is formed from a single piece of machined material and, as a result is capable of transmitting vertical loads and axial thrust loads to the pylon box 20. By employing an assembly constructed in accordance with the present invention, it is possible to eliminate the need for a separate thrust link system as required by the Concorde engine mount assembly.

Referring again to FIG. 3, it is noted that a pair of smaller engine mount assemblies 70 are attached to forward end of pylon box 20. Each assembly 70 includes an arm 72 attached at one end to pylon box 20 and attached at an opposite end to an engine mount 74. Each engine mount 74 includes an inner surface 76 having a curved configuration compatible with the curved outer surface of engine casing 21.

When assembled, pylon box 20 creates an aft-cantilevered pylon assembly. The forward engine mounts 64 engage engine casing 21 on its centerline and serve to constrain engine casing against both vertical and axial motion without the need for any additional struts, linkages or other assemblies. While an A-Frame shape is preferred for the yoke 40, it is considered within the scope of the present invention to employ yokes with other configurations capable of supporting engine casing 21. Likewise, while it is preferable to form the entire yoke member from a single piece of material, it is within the scope of the present invention to construct the yoke from more than one piece of material, provided care is taken in joining the pieces to assure that the fastener, i.e. wielding is sufficiently strong to carry the loads which may arise.

In general, although a preferred embodiment of the present invention has been described in detail hereinabove, it should be clearly understood that many variations and/or modifications of the basic inventive concepts herein taught which may appear to those skilled in the pertinent art will still fall with the spirit and scope of the present invention, as defined in the appended claims.

Having thus described our invention, what we claim as new and desire to secure by letters patent is as follows:

1. An engine support system for constraining an aircraft engine casing against vertical and/or axial thrust movements relative to the aircraft wing, and comprising:

a pylon box assembly attached to a bottom surface of wing for supporting an aircraft engine in an aft-cantilevered position beneath the wing;

a yoke assembly having an upper portion attached to the pylon box assembly and including a pair of opposite side portions wrapped about opposite sides of the engine casing, wherein each side portion of the yoke assembly forms an A-shaped frame member with the bottom portions of the two A-shaped frame members joined to one another and also joined to the pylon box assembly at a location between the opposite ends of the pylon box; and a separate trunnion assembly attached to each side portion of the yoke, wherein each trunnion assembly includes a forward engine mount engaging the engine casing along its centerline.

2. The system according to claim 1, wherein the pylon box assembly is constructed from a plurality of tubular struts forming a substantially rectangular configuration of diminishing size as the distance increases from one end, with a plurality of cross braces spaced from one another and extending between opposite sides of the pylon box assembly.

3. The system according to claim 2, wherein a plurality of four tubular struts form the pylon box assembly with a pair of struts forming each side of the pylon box assembly approaching toward one another as the distance from the one end increases.

4. The system according to claim 1, wherein the yoke assembly is integrally formed.

5. The system according to claim 1, wherein the yoke assembly is formed of a plurality of separate members joined to one another and further joined to the pylon box assembly.

6. The system according to claim 1, wherein each trunnion assembly is attached to an end plate mounted at a top end portion of one of the A-shaped sides of the yoke assembly and includes a cylindrical member retained within a cylindrical opening formed by the end plate and a lower fitting fastened to the end plate.

7. The system according to claim 6, wherein each trunnion assembly further includes a forward engine mount attached to an end of the cylindrical member and having a curved face engaging the engine casing.

8. The system according to claim 7, wherein the curved surface of each forward engine mount engages the engine casing along the centerline of the casing.

9. The system according to claim 1, further comprising a pair of engine mount assemblies disposed on opposite sides of a forward end portion of the pylon box assembly, with each mount having a curved surface adaptable for engaging the engine casing.

10. An aircraft engine mount assembly for constraining an aircraft engine casing against vertical and/or axial thrust movements relative to the aircraft wing, comprising:

- a pylon assembly attached to the bottom surface of an aircraft wing for supporting an aircraft engine in an aft-cantilevered position beneath the wing;
- a yoke assembly including a pair of side portions each forming a substantially A-shaped frame member with bottom portion of each A-shaped member joining one another and further joining the pylon assembly; and
- a separate trunnion assembly attached to each side portion of the yoke assembly, with each trunnion assembly including an engine mount engaging the engine casing on opposite sides thereof.

11. An aircraft assembly according to claim 10, wherein the pylon assembly comprises four separate tubular struts forming a rectangular cross section of diminishing size as the distance from one end increases.

12. An aircraft assembly according to claim 11, wherein the pylon assembly further comprises a plurality of separate cross braces spaced from one another with each brace extending between opposite sides of the pylon assembly.

13. An aircraft assembly according to claim 10, wherein the yoke assembly is integrally formed.

14. An aircraft assembly according to claim 10, wherein the yoke assembly is formed from a plurality of separate members that are joined together and also joined to the pylon assembly.

15. An aircraft assembly according to claim 10, wherein each trunnion assembly includes a forward engine mount having a cylindrically-shaped end portion, with an end plate having a cylindrically-shaped opening facing a lower fitting with a similarly-shaped cylindrically-shaped opening, whereby the cylindrically-shaped end portion of the engine mount is retained within the cylindrical openings in the end plate and lower fitting when fastened together.

* * * * *